(No Model.)

A. P. HANSON.
VELOCIPEDE.

No. 456,989. Patented Aug. 4, 1891.

Witnesses:
W. J. Sankey
R. H. Orwig

Inventor: Andrew P. Hanson
By Thomas G. Orwig, Attorney

UNITED STATES PATENT OFFICE.

ANDREW P. HANSON, OF SERGEANT BLUFFS, IOWA.

VELOCIPEDE.

SPECIFICATION forming part of Letters Patent No. 456,989, dated August 4, 1891.

Application filed April 6, 1891. Serial No. 387,717. (No model.)

*To all whom it may concern:*

Be it known that I, ANDREW P. HANSON, a citizen of the United States of America, and a resident of Sergeant Bluffs, in the county of Woodbury and State of Iowa, have invented a new and useful Velocipede, of which the following is a specification.

My invention consists in the construction and combination of a carriage-frame, a rotating crank-shaft, a rock-shaft and seat, means for transmitting motion from the seat, and an adjustable foot-rest, as hereinafter set forth, pointed out in my claim, and illustrated in the accompanying drawings, in which—

Figure 1:
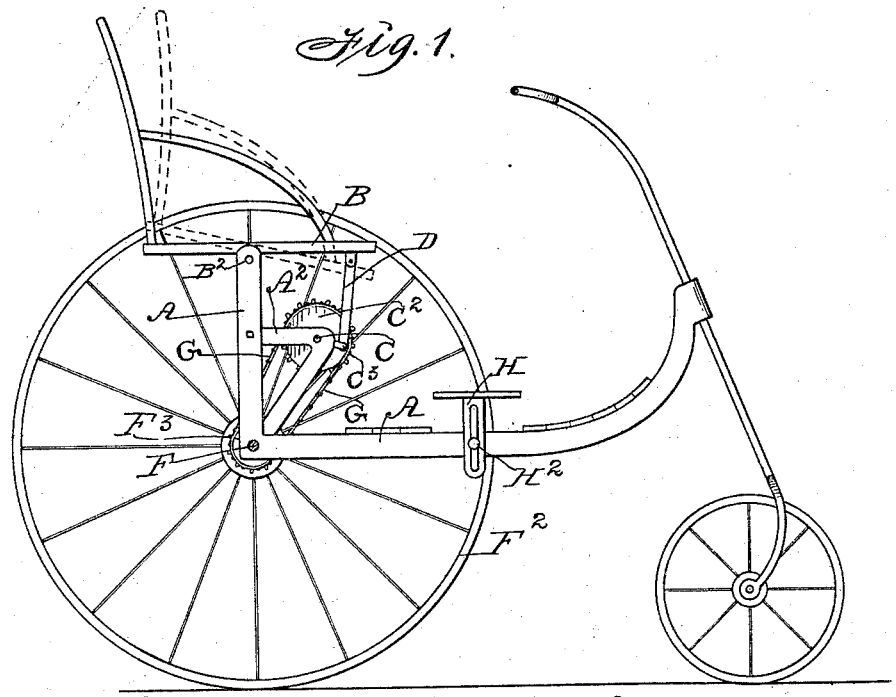
Figure 2:
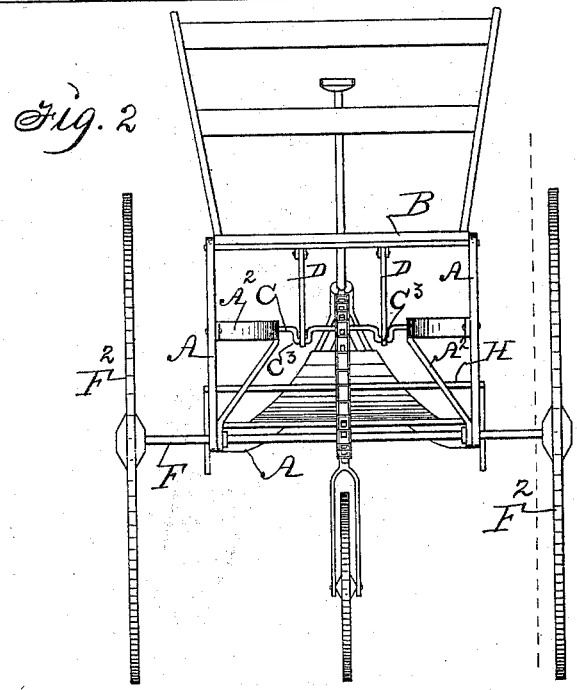

Figure 1 is a side view showing one of the wheels removed; and Fig. 2 is a rear view of the machine, showing the operative mechanism.

A is the frame of the velocipede of a peculiar shape. It is composed of two mating parts connected at their front ends, and is adapted to admit and support a steering-bar and wheel-bearer. At its rear lower ends are bearings adapted to support a rotating axle that has traction-wheels on its ends. At the parallel tops of the frame are bearings adapted to support a rock-shaft, and near their centers are bearers $A^2$, that project forward to support a crank-shaft.

B is a rocking seat or chair of common form, firmly attached to a rock-shaft $B^2$ in the bearings at the tops of the mating parts of the frame A.

C is a crank-shaft in the bearers $A^2$. A sprocket-wheel $C^2$ is fixed to the center of the shaft C and connected to and rotated by means of the seat B.

D are straight rods or bars pivotally connected with the bottom and front portion of the seat and with the crank-arms $C^3$ of the shaft C in such a manner that the vibratory motion of the seat is thereby transmitted to rotate the shaft C.

F is an axle of common form, with bearings in the frame A, and $F^2$ are traction-wheels fixed to its ends. A sprocket-wheel $F^3$, fixed to the center of the axle F, is connected with the crank-shaft C, by means of a chain G, to transmit power and motion to the axle F and wheels $F^2$, as required, to propel the wheels.

H is a foot-rest adjustably connected with the supporting-frame A by means of a set-screw $H^2$, as required, to adapt it to persons of different sizes.

I claim as my invention—

A velocipede comprising a frame composed of two mating elbow-shaped side pieces joined together at their front ends, a rotating axle journaled to the rear corners of the frame and traction-wheels fixed to the ends of the axle, a wheel-bearer journaled to the front end of the frame and a wheel journaled to the lower end of the said bearer, a rock-shaft journaled to the parallel top portions of the frame, a seat fixed to said rock-shaft, a crank-shaft in bearers fixed to the sides of the frame to project forward relative to the rock-shaft, links pivoted to the cranks of the crank-shaft and to the front portions of the chair, a sprocket-wheel fixed to the rotating axle, a sprocket-wheel fixed to the crank-shaft, a chain connecting the two sprocket-wheels, and an adjustable seat connected with the side pieces of the frame, all arranged and combined to operate in the manner set forth.

ANDREW P. HANSON.

Witnesses:
F. W. MAROTZ,
C. O. INGOOLDSTAD.